(12) United States Patent
Wetzel et al.

(10) Patent No.: US 11,440,789 B2
(45) Date of Patent: Sep. 13, 2022

(54) FUEL TANK FILL ASSEMBLY

(71) Applicant: Stant USA Corp., Connersville, IN (US)

(72) Inventors: Paul C. Wetzel, Oxford, OH (US); Kevin M. Sin, Ferndale, MI (US); Rick A. Willis, Richmond Township, MI (US)

(73) Assignee: Stant USA Corp., Connersville, IN (US)

(*) Notice: Subject to any disclaimer, the term of this patent is extended or adjusted under 35 U.S.C. 154(b) by 896 days.

(21) Appl. No.: 16/265,199

(22) Filed: Feb. 1, 2019

(65) Prior Publication Data

US 2019/0256345 A1 Aug. 22, 2019

Related U.S. Application Data

(60) Provisional application No. 62/664,368, filed on Apr. 30, 2018, provisional application No. 62/710,413, filed on Feb. 16, 2018.

(51) Int. Cl.
| | |
|---|---|
| *B67D 7/42* | (2010.01) |
| *F16L 3/12* | (2006.01) |
| *F16L 58/02* | (2006.01) |
| *B21D 53/88* | (2006.01) |
| *B60K 15/04* | (2006.01) |

(52) U.S. Cl.
CPC ............. *B67D 7/421* (2013.01); *B21D 53/88* (2013.01); *B60K 15/04* (2013.01); *F16L 3/12* (2013.01); *F16L 58/02* (2013.01)

(58) Field of Classification Search
CPC ........ B67D 7/421; B21D 53/88; B60K 15/04; B60K 15/01; B60K 15/00; B60K 2015/04; B60K 2015/0474; B60K 2015/047; F16L 3/12; F16L 58/02
USPC .......... 141/18; 248/74.3, 62, 74.1; 220/86.2; 24/16 R, 20 R, 16 PB
See application file for complete search history.

(56) References Cited

U.S. PATENT DOCUMENTS

| | | | | |
|---|---|---|---|---|
| 3,099,054 | A | * | 7/1963 | Spiro ............... F16L 3/1236 248/74.3 |
| 4,153,228 | A | * | 5/1979 | Delserro ............ F16L 3/123 24/19 |
| 4,304,822 | A | | 12/1981 | Heyl |
| 4,490,888 | A | * | 1/1985 | Levant ............... F16L 3/1233 24/286 |
| 4,500,399 | A | | 2/1985 | Hart et al. |
| 6,099,908 | A | | 8/2000 | Hirano |

(Continued)

FOREIGN PATENT DOCUMENTS

JP   2007216935 A  *  8/2007

OTHER PUBLICATIONS

JP-2007216935-A English Translation of Specification (Year: 2022).*

*Primary Examiner* — Reinaldo Sanchez-Medina
*Assistant Examiner* — Stephanie A Shrieves
(74) *Attorney, Agent, or Firm* — Barnes & Thornburg LLP

(57) ABSTRACT

A fuel tank fill assembly includes a fuel fill tube adapted to be coupled to a fuel tank and configured to receive fuel discharged by a pump nozzle. The assembly includes a tube mounting bracket for mounting the fuel fill tube in a stationary position in a vehicle to conduct fuel to the fuel tank. A process for coating the tube mounting bracket is disclosed.

10 Claims, 5 Drawing Sheets

(56) References Cited

U.S. PATENT DOCUMENTS

| | | | | |
|---|---|---|---|---|
| 6,126,119 | A | * | 10/2000 | Giangrasso ............ F16L 55/035 248/74.1 |
| 6,152,412 | A | * | 11/2000 | Basickes ................. F16L 3/127 248/74.1 |
| 6,610,422 | B1 | | 8/2003 | Ooi et al. |
| 7,328,724 | B2 | * | 2/2008 | Britton .................. F16L 3/1091 248/603 |
| 7,367,101 | B2 | * | 5/2008 | Takahashi ............... B60K 15/04 248/65 |
| 9,776,501 | B2 | | 10/2017 | Dominic et al. |
| 2015/0274008 | A1 | * | 10/2015 | Kito ....................... B60K 15/04 141/311 R |
| 2015/0352948 | A1 | * | 12/2015 | Kito .................... B60K 15/035 220/86.1 |
| 2017/0089491 | A1 | * | 3/2017 | Kito ....................... F16L 55/035 |
| 2017/0259665 | A1 | * | 9/2017 | Zhangsheng .......... B23K 31/02 |
| 2019/0351759 | A1 | * | 11/2019 | Willis .................... B60K 15/04 |

* cited by examiner

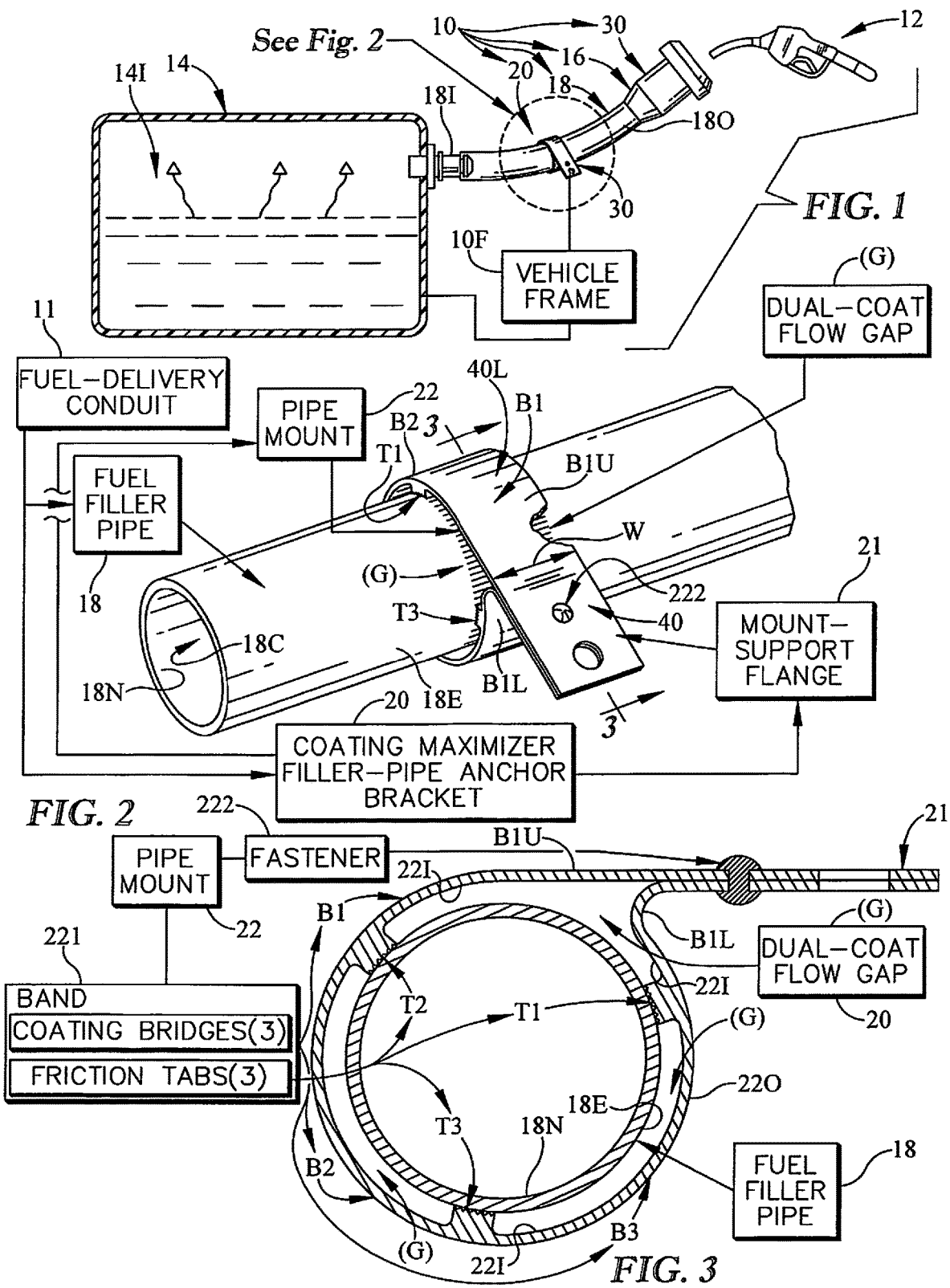

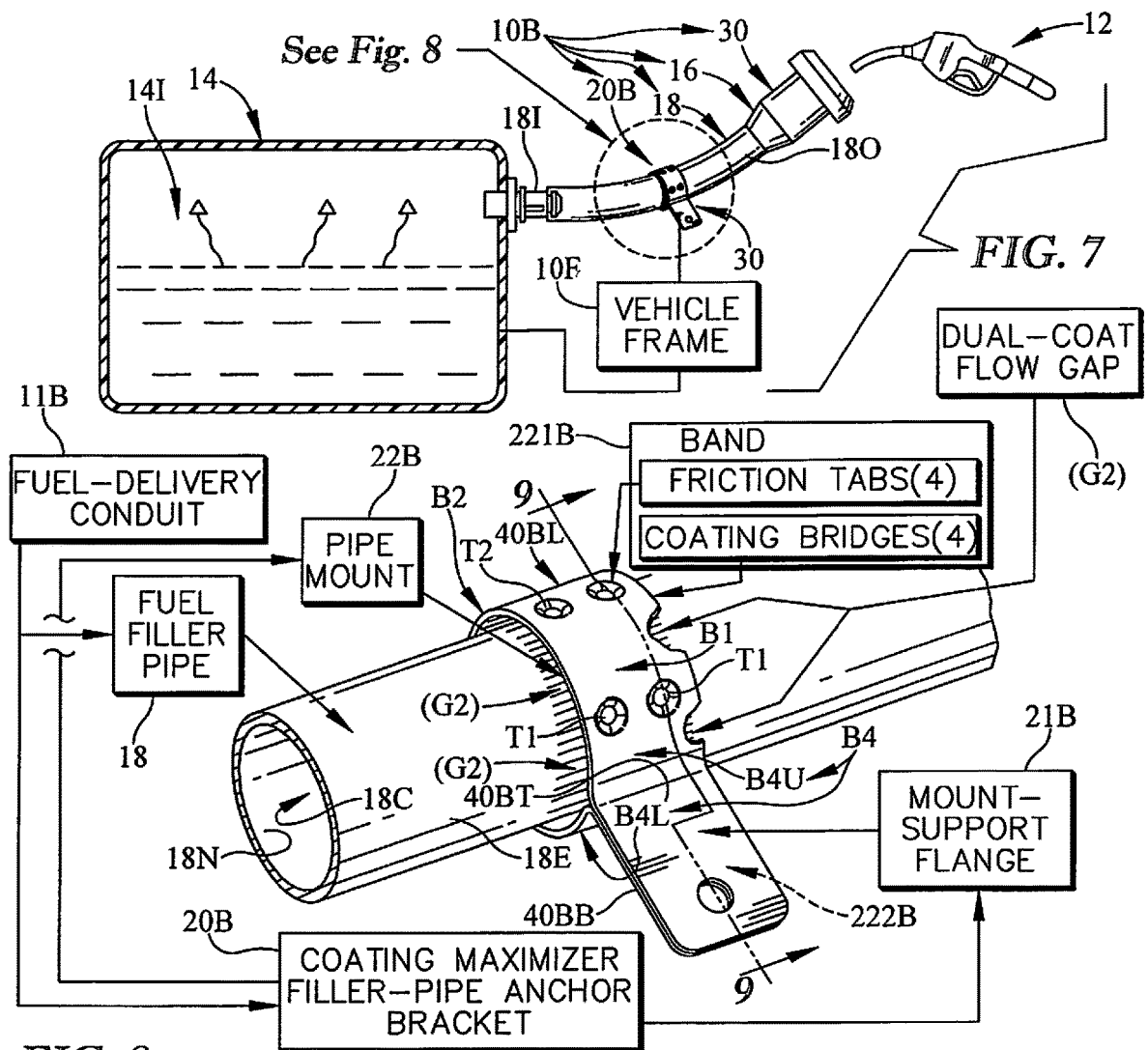
FIG. 7
FIG. 8
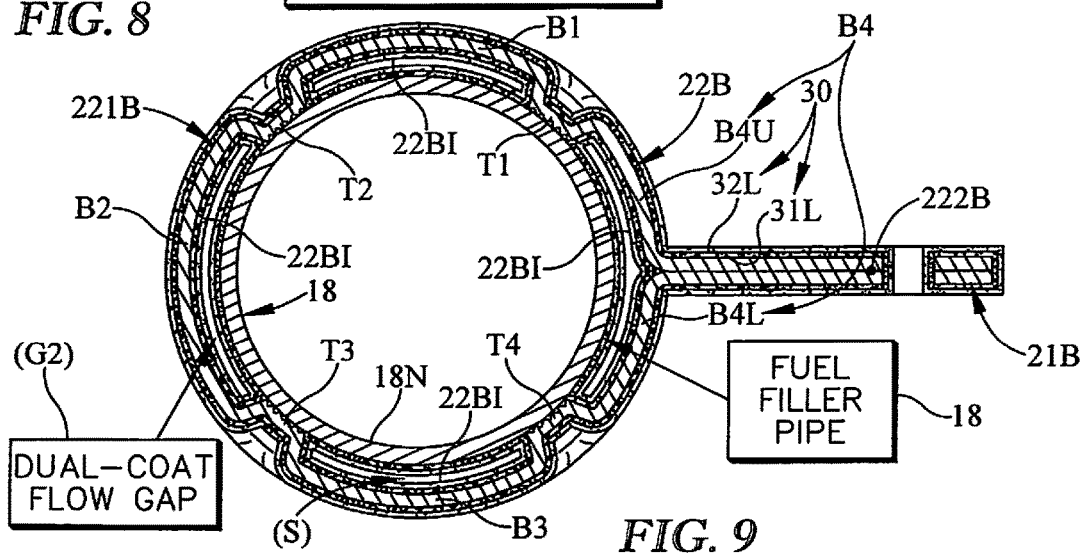
FIG. 9

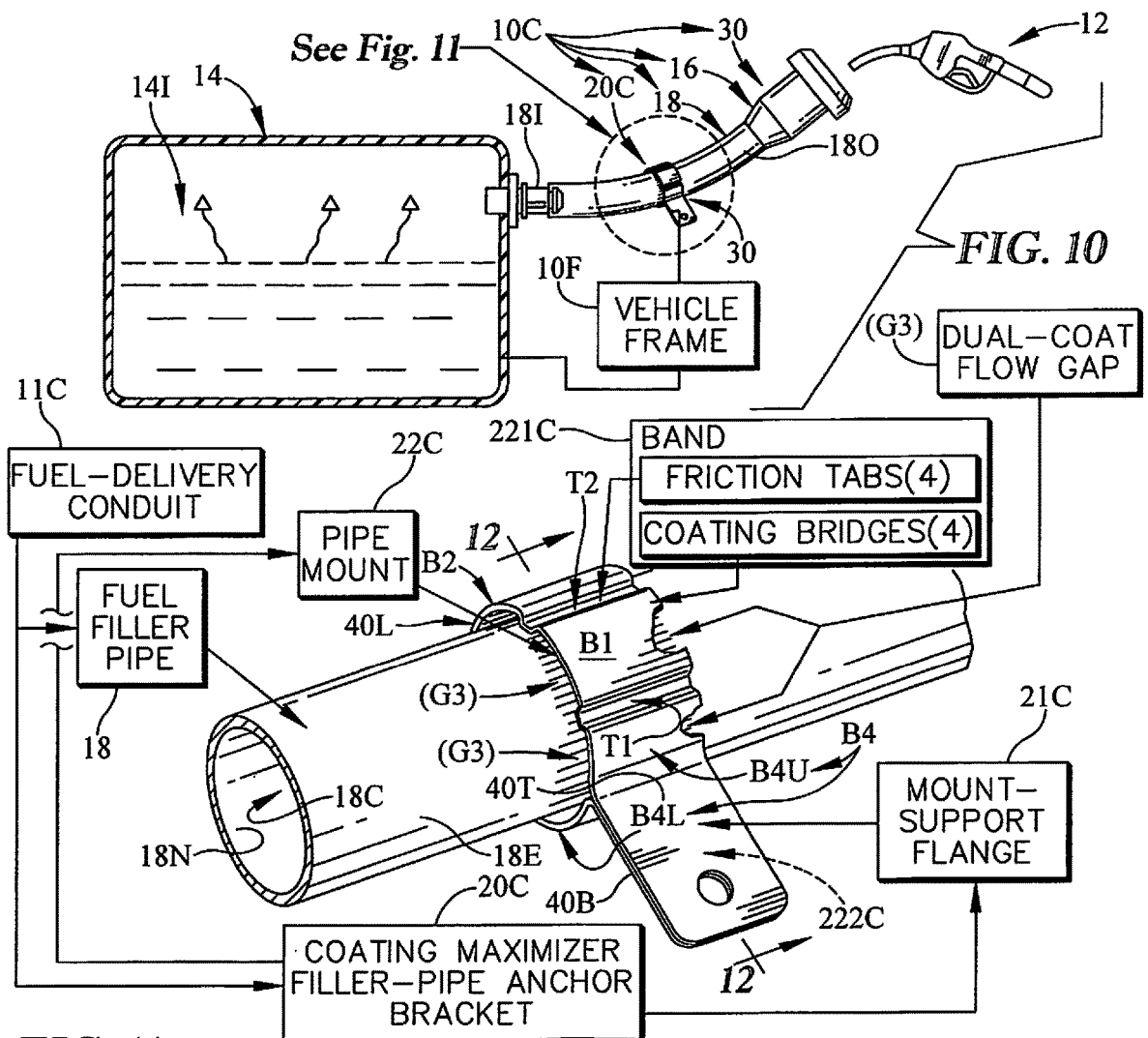
*FIG. 10*
*FIG. 11*
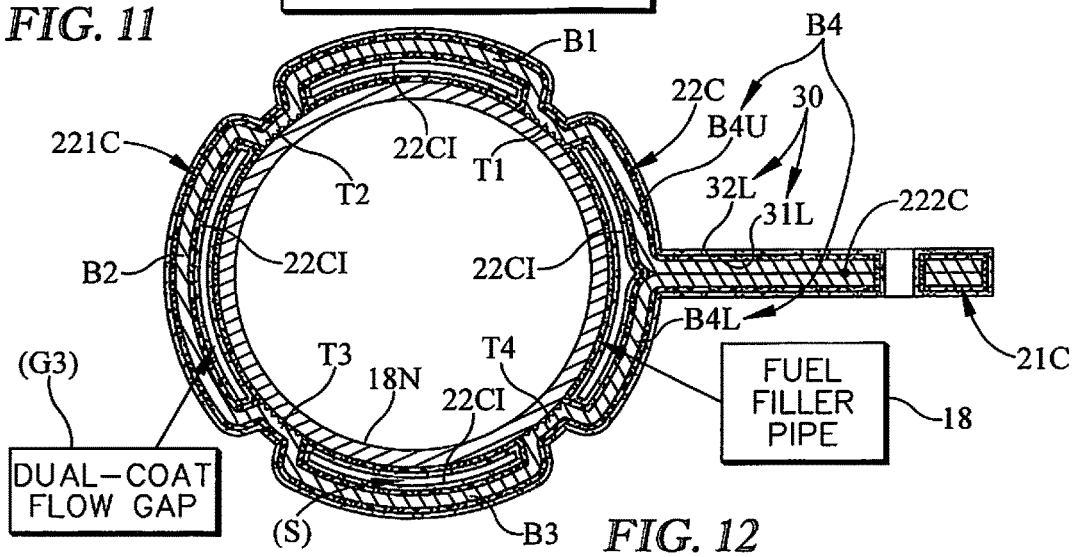
*FIG. 12*

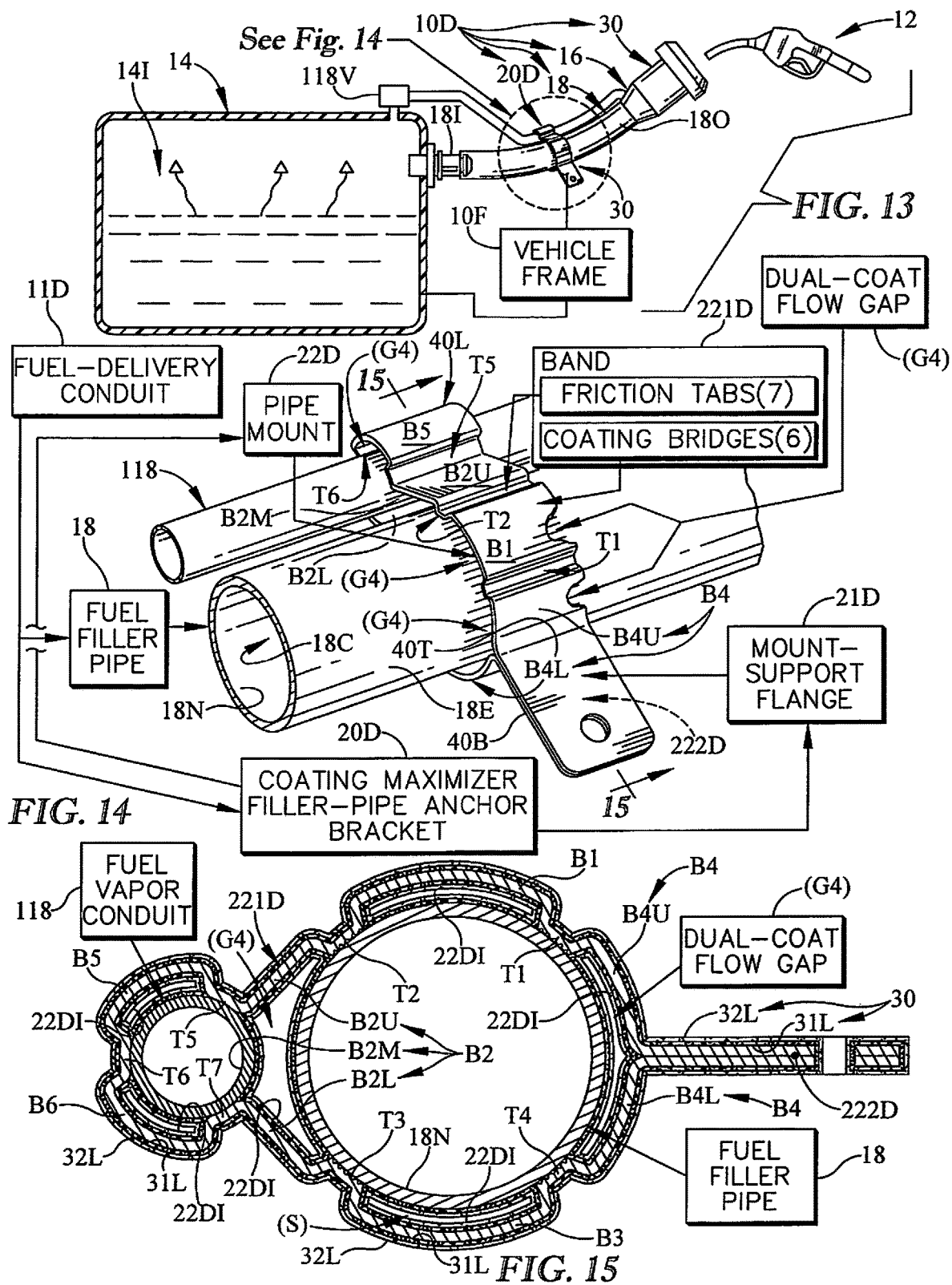

FUEL TANK FILL ASSEMBLY

PRIORITY CLAIM

This application claims priority under 35 U.S.C. § 119(e) to US Provisional Application Nos. 62/710,413, filed Feb. 16, 2018, and 62/664,368, filed Apr. 30, 2018, each of which is expressly incorporated by reference herein.

BACKGROUND

The present disclosure relates to a fuel tank fill assembly. More particularly, the present disclosure relates to a fuel tank fill assembly for a vehicle fuel tank.

SUMMARY

According to the present disclosure, a fuel tank fill assembly comprises an inlet cup and a fuel filler pipe extending from the inlet cup to a fuel tank. The fuel filler pipe is adapted to conduct liquid fuel from the inlet cup to the fuel tank during refueling.

In illustrative embodiments, a filler-pipe anchor bracket is mounted on the fuel filler pipe made of carbon steel to provide an uncoated fuel-delivery conduit that can be used to conduct liquid fuel to a vehicle fuel tank. The pipe mount of the filler-pipe anchor bracket is coupled to the fuel filler pipe using a friction-fit system in accordance with the present disclosure to maximize application of a two-layer protective coating to all exposed portions of the filler-pipe anchor bracket and the fuel filler pipe that are included in the uncoated fuel-delivery conduit and especially in dual-coat flow gaps that are formed between the friction-fit pipe mount and the fuel filler pipe in accordance with the present disclosure so that corrosion of the friction-fit pipe mount and fuel filler pipe is minimized.

In an illustrative process in accordance with the present disclosure, a pipe mount of the filler-pipe anchor bracket is mounted on the fuel filler pipe using a friction-fit system disclosed herein to form several dual-coat flow gap therebetween. Then a corrosion-resistant first coating material is applied to an exposed inner surface of the friction-fit pipe mount and an opposed exterior surface of the fuel filler pipe to establish a first coating layer in dual-coat flow gap. Subsequently, a corrosion-resistant second coating material is applied to exposed surfaces of the first coating layer to establish a second coating layer in each dual-coat flow gap. Each gap is sized to allow the first and second coating materials to flow into the gap in sequence to establish a multi-layer protective coating on the friction-fit pipe mount and the fuel filler pipe in the dual-coat flow gap. The multi-layer protective coating is applied to the inlet cup in addition to the fuel filler pipe and the filler-pipe anchor bracket to provide a corrosion-resistant fuel tank fill assembly.

In illustrative embodiments, the pipe mount is coupled to a curved exterior surface of the fuel filler pipe using a friction-fit system disclosed herein to form the several dual-coat flow gap between the pipe mount and a convex outer surface of the fuel filler pipe. A mount-support flange also included in the filler-pipe anchor bracket is coupled to the friction-fit pipe mount and arranged to extend away from the fuel filler pipe to accommodate coupling of the filler-pipe anchor bracket to another component of a vehicle, e.g., a vehicle frame.

In illustrative embodiments, the friction-fit pipe mount includes several friction tabs that are arranged to lie in circumferentially spaced-apart relation about and in engagement with the curved exterior surface of the fuel filler pipe. The friction-fit pipe mount also includes several coating bridges. Each of the coating bridges is arranged to interconnect proximal ends of two adjacent friction tabs and lie in radially outwardly spaced-apart relation to a portion of the curved exterior surface of the fuel filler pipe that extends between those two adjacent friction tabs to form therebetween a dual-coat flow gap in accordance with the present disclosure.

In illustrative embodiments, each dual-coat flow gap is sized to provide means for allowing a first coating material such as an undercoat zinc-rich primer and then a second coating material such as a top-coat anti-corrosion paint to move into the flow gap and coat the interior surface of the friction-fit pipe mount and the opposed exterior surface of the fuel filler pipe so that portions of the uncoated fuel-delivery conduit in the dual-coat flow gap are now coated and thus protected from corrosive influences during use. A protective coating comprising the first and second coating materials is also applied to exterior portions of the fuel filler pipe, filler-pipe anchor bracket, and the inlet cup to improve corrosion-resistance of the fuel tank fill assembly. The result is that a corrosion-resistant fuel tank fill assembly is provided in accordance with the present disclosure.

In illustrative embodiments, the friction tabs and the coating bridges of the friction-fit pipe mount cooperate to form a band that surrounds the curved outer surface of the fuel filler pipe. The friction-fit pipe mount also includes a fastener that is coupled to the band to tighten the band around the fuel filler pipe to establish a friction fit between free ends of the friction tabs and the curved outer surface of the fuel filler pipe and hold the band in a stationary position surrounding a portion of the fuel filler pipe. The fastener is a bolt that is coupled to opposite ends of the band in illustrative embodiments. It is within the scope of the present disclosure to use weldment or other suitable fastening means to provide the fastener.

In illustrative embodiments, the band of the friction-fit pipe mount includes a top strap, a bottom strap arranged to lie in side-by-side mating relation to the top strap, and a loop that interconnects the top and bottom straps and is formed to include the friction tabs and the coating bridges. The mount-support flange is coupled to free ends of the side-by-side top and bottom straps of the band. The fastener is coupled to the side-by-side top and bottom straps of the band to block movement of the bottom strap relative to the top strap and tighten the loop to lie in a stationary position wrapped around and in engagement with the fuel filler pipe.

Additional features of the disclosure will become apparent to those skilled in the art upon consideration of illustrative embodiments exemplifying the best mode of carrying out the disclosure as presently perceived.

BRIEF DESCRIPTION OF THE DRAWING

Figure 5:
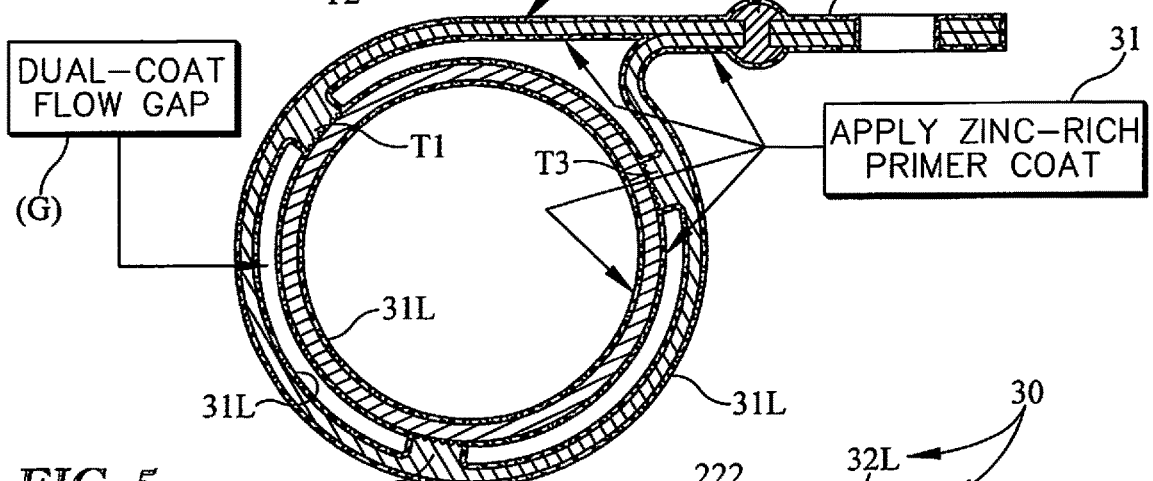
Figure 6:
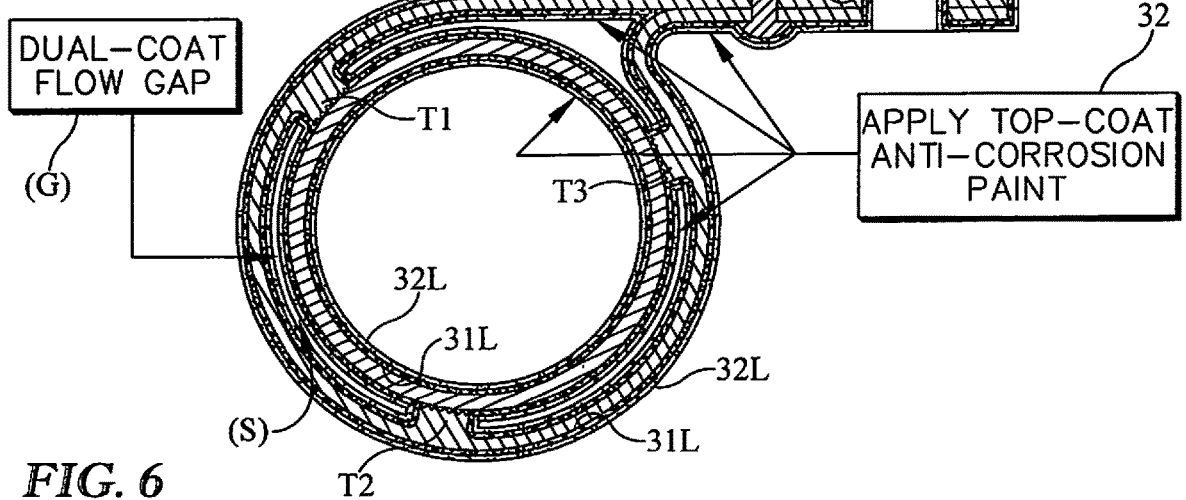

The detailed description particularly refers to the accompanying figures in which:

FIG. 1 is a side elevation view of a fuel system including a fuel tank and a fuel tank fill assembly for conducting fuel into the fuel tank during refueling and showing that the fuel tank fill assembly includes an inlet cup, a fuel filler pipe that extends from the inlet cup to the fuel tank, and a coating maximizer filler-pipe anchor bracket mounted to the fuel filler pipe using a friction-fit system as shown in FIG. 2 in accordance with the present disclosure to provide several dual-coat flow gaps that are sized as suggested in FIGS. 3 and 4 to receive therein a corrosion-resistant first coating material as suggested in FIG. 5 and then a corrosion-resistant second coating material as suggested in FIG. 6;

Figure 4:
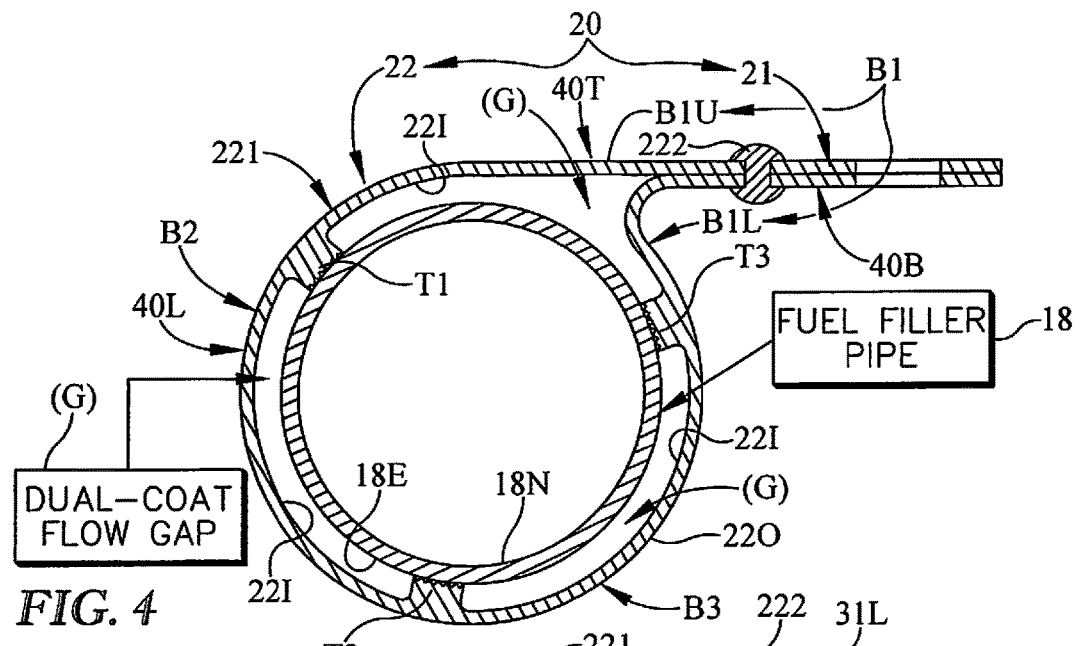

FIG. 2 is an enlarged view of a portion of the fuel tank fill assembly of FIG. 1 before a two-layer protective coating is applied to an uncoated fuel-delivery conduit comprising the fuel filler pipe and the coating maximizer filler-pipe anchor bracket coupled to the fuel filler pipe (the protective coating is applied using an illustrative two-stage coating process suggested in FIGS. 4-6) and showing that the coating maximizer filler-pipe anchor bracket includes a friction-fit pipe mount arranged to wrap around the fuel filler pipe and a mount-support flange coupled to the friction-fit pipe mount and arranged to extend away from the fuel filler pipe, and further showing that the friction-fit pipe mount is positioned in a stationary position on the fuel filler pipe using a friction-fit system such that several dual-coat flow gaps in accordance with the present disclosure are formed between the friction-fit pipe mount and a cylindrical exterior surface of the fuel filler pipe as shown in FIG. 3 to extend longitudinally along a portion of the length of the fuel filler pipe as suggested in FIG. 2;

FIG. 3 is a sectional view taken along line 3-3 of FIG. 2 showing that the friction-fit pipe mount includes a band comprising three friction tabs engaged to the circular outer surface of the fuel filler pipe and three coating bridges and showing that each coating bridge interconnects a pair of adjacent friction tabs, and further showing that each dual-coat flow gap is sized to allow an undercoat zinc-rich primer and a top-coat anti-corrosion paint (1) to cover exterior portions of the fuel filler pipe and filler-pipe anchor bracket and (2) to move in sequence into the dual-coat flow gap and coat a cylindrical exterior surface of the fuel filler pipe and an opposed inner surface of the friction-fit pipe mount after the friction-fit pipe mount of the filler-pipe anchor bracket has been coupled to the fuel filler pipe so that a multi-layer protective coating is established on the uncoated fuel-delivery conduit as suggested in FIGS. 4-6;

FIGS. 4-6 show a two-stage sequence for applying corrosion-resistant first and second coating materials to the friction-fit pipe mount, the mount-support flange, and the fuel filler pipe, to establish a first coating layer comprising a zinc-rich primer and then a second coating layer comprising an anti-corrosion paint in the dual-coat flow gaps formed between the friction-fit pipe mount and the fuel filler pipe and on other exterior surfaces of the friction-fit pipe mount and fuel filler pipe;

FIG. 4 shows a result of tightening of the band of the friction-fit pipe mount to the fuel filler pipe using the fastener to cause the friction tabs to engage the circular exterior surface of the fuel filler pipe so as to establish several dual-coat flow gaps between an inner surface of the friction-fit pipe mount and an opposed circular exterior surface of the fuel filler pipe;

FIG. 5 shows introduction of a corrosion-resistant first coating material into the dual-coat flow gaps formed between the friction-fit pipe mount and the fuel filler pipe in accordance with the present disclosure to establish a first coating layer on exposed surfaces of the friction-fit pipe mount and the fuel filler pipe and also shows application of the first coating material to other exposed surfaces of the friction-fit pipe mount, mount-support flange, and fuel filler pipe;

FIG. 6 shows subsequent introduction of a corrosion-resistant second coating material into the dual-coat flow gaps in accordance with the present disclosure to establish a second coating layer on exposed surfaces of the first coating layer and also shows application of the second coating material to other exposed surfaces of the first coating layer;

FIGS. 7-9 show a differently shaped coating maximizer filler-pipe anchor bracket in accordance with a second embodiment of the present disclosure;

FIG. 7 is a side elevation view of a fuel system including a fuel tank and a fuel tank fill assembly for conducting fuel into the fuel tank during refueling and showing that the fuel tank fill assembly includes an inlet cup, a fuel filler pipe that extends from the inlet cup to the fuel tank, and a coating maximizer filler-pipe anchor bracket mounted to the fuel filler pipe using a friction-fit system as shown in FIG. 8 in accordance with the present disclosure to provide several dual-coat flow gaps that are sized to receive therein a corrosion-resistant first coating material and then a corrosion-resistant second coating material as suggested in FIG. 9;

FIG. 8 is an enlarged view of a portion of the fuel tank fill assembly of FIG. 7 before a two-layer protective coating is applied to an uncoated fuel-delivery conduit comprising the fuel filler pipe and the coating maximizer filler-pipe anchor bracket coupled to the fuel filler pipe and showing that the coating maximizer filler-pipe anchor bracket includes a friction-fit pipe mount arranged to wrap around the fuel filler pipe and a mount-support flange coupled to the pipe mount and arranged to extend away from the fuel filler pipe, and further showing that the pipe mount is positioned in a stationary position on the fuel filler pipe using a friction-fit system such that several dual-coat flow gaps in accordance with the present disclosure are formed between the friction-fit pipe mount and a cylindrical exterior surface of the fuel filler pipe;

FIG. 9 shows that a two-layer corrosion-resistant protective coating has been applied to the fuel filler pipe and the filler-pipe anchor bracket and suggests that each of the first and second coatings flowed in sequence into and through the dual-coat flow gap to cover exposed portions of the friction-fit pipe mount and the fuel filler pipe during establishment of the two-layer protective coating and also suggesting that each of the first and second coatings flowed in sequence onto other exposed portions of the friction-fit pipe mount, mount-support flange, and fuel filler pipe;

FIGS. 10-12 show another differently shaped coating maximizer filler-pipe anchor bracket in accordance with a third embodiment of the present disclosure;

FIG. 10 is a side elevation view of a fuel system including a fuel tank and a fuel tank fill assembly for conducting fuel into the fuel tank during refueling and showing that the fuel tank fill assembly includes an inlet cup, a fuel filler pipe that extends from the inlet cup to the fuel tank, and a coating maximizer filler-pipe anchor bracket mounted to the fuel filler pipe using a friction-fit system as shown in FIG. 11 in accordance with the present disclosure to provide several dual-coat flow gaps that are sized to receive therein a corrosion-resistant first coating material and then a corrosion-resistant second coating material as suggested in FIG. 12;

FIG. 11 is an enlarged view of a portion of the fuel tank fill assembly of FIG. 10 before a two-layer protective coating is applied to an uncoated fuel-delivery conduit comprising the fuel filler pipe and the coating maximizer filler-pipe anchor bracket coupled to the fuel filler pipe and showing that the coating maximizer filler-pipe anchor bracket includes a friction-fit pipe mount arranged to wrap around the fuel filler pipe and a mount-support flange coupled to the pipe mount and arranged to extend away from the fuel filler pipe, and further showing that the pipe mount is positioned in a stationary position on the fuel filler pipe using a friction-fit system such that several dual-coat flow gaps in accordance with the present disclosure are formed between the friction-fit pipe mount and a cylindrical exterior surface of the fuel filler pipe;

FIG. 12 shows that a two-layer corrosion-resistant protective coating has been applied to the fuel filler pipe and the filler-pipe anchor bracket and suggests that each of the first and second coatings flowed in sequence into and through the dual-coat flow gap to cover exposed portions of the fuel filler pipe during establishment of the two-layer protective coating and also suggesting that each of the first and second coatings flowed in sequence onto other exposed portions of the friction-fit pipe mount, mount-support flange, and fuel filler pipe;

FIGS. 13-15 show another differently shaped coating maximizer filler-pipe anchor bracket in accordance with a fourth embodiment of the present disclosure;

FIG. 13 is a side elevation view of a fuel system including a fuel tank and a fuel tank fill assembly for conducting fuel into the fuel tank during refueling and showing that the fuel tank fill assembly includes an inlet cup, a fuel filler pipe that extends from the inlet cup to the fuel tank, a fuel vapor conduit that extends alongside the fuel filler pipe and provides a fuel vapor passageway interconnecting an outer end of the fuel filler pipe and a vapor space in the fuel tank, and a coating maximizer filler-pipe anchor bracket mounted to the fuel filler pipe and to the fuel vapor conduit using a friction-fit system as shown in FIG. 14 in accordance with the present disclosure to provide several dual-coat flow gaps that are sized to receive therein a corrosion-resistant first coating material and then a corrosion-resistant second coating material as suggested in FIG. 15;

FIG. 14 is an enlarged view of a portion of the fuel tank fill assembly of FIG. 10 before a two-layer protective coating is applied to an uncoated fuel vapor conduit and to an uncoated fuel-delivery conduit lying alongside the uncoated vapor conduit and comprising the fuel filler pipe and the coating maximizer filler-pipe anchor bracket coupled to the fuel filler pipe and showing that the coating maximizer filler-pipe anchor bracket includes a friction-fit pipe mount arranged to wrap around the fuel filler pipe and the fuel vapor conduit and a mount-support flange coupled to the friction-fit pipe mount and arranged to extend away from the fuel filler pipe, and further showing that the friction-fit pipe mount is positioned in a stationary position on the fuel filler pipe and the fuel vapor conduit using a friction-fit system such that several dual-coat flow gaps in accordance with the present disclosure are formed (1) between the friction-fit pipe mount and a cylindrical exterior surface of the fuel filler pipe and (2) between the friction-fit pipe mount and a cylindrical exterior surface of the fuel vapor conduit, and (3) between the fuel filler pipe and the fuel vapor conduit; and FIG. 15 shows that a two-layer corrosion-resistant protective coating has been applied to the fuel filler pipe, the fuel vapor conduit and the filler-pipe anchor bracket and suggests that each of the first and second coatings flowed in sequence into and through the dual-coat flow gap to cover exposed portions of the friction-fit pipe mount and the fuel filler pipe during establishment of the two-layer protective coating and also suggesting that each of the first and second coatings flowed in sequence onto other exposed portions of the friction-fit pipe mount, mount-support flange, fuel filler pipe, and the fuel vapor conduit.

DETAILED DESCRIPTION

A fuel tank fill assembly 10 is configured to conduct fuel from a fuel-dispensing pump nozzle 12 to a fuel tank 14 as suggested in FIG. 1. Fuel fill tank assembly 10 includes an inlet cup 16 sized to receive nozzle 12, a fuel filler pipe 18 configured to conduct liquid fuel discharged by nozzle 12 into inlet cup 16 to an interior region 14I of fuel tank 14, and a filler-pipe anchor bracket 20. Fuel tank fill assembly 10 also includes a two-layer corrosion-resistant protection coating 30 applied in accordance with the present disclosure as suggested in FIGS. 4-6.

Filler-pipe anchor bracket 20 is mounted on fuel filler pipe 18 using a friction-fit system in accordance with the present disclosure to produce an uncoated fuel-delivery conduit 11 as suggested in FIG. 2 and to establish several dual-coat flow gaps (G) between fuel filler pipe 18 and filler-pipe anchor bracket 20 as suggested in FIGS. 3 and 4. A corrosion-resistant protective coating 30 is applied to the uncoated fuel-delivery conduit 11 as suggested in FIGS. 5 and 6 so that exposed portions of pipe 18 and bracket 20 bordering dual-coat flow gaps (G) are coated in accordance with the present disclosure along with all other exposed portions of the uncoated fuel-delivery conduit 11.

It is within the scope of the present disclosure to vary the configuration of coating maximizer filler-pipe anchor bracket 20 to produce various dual-coat flow gaps. In each of the alternative embodiments described herein a friction-fit system in accordance with the present disclosure is used to mount the coating maximizer filler-pipe anchor bracket on the fuel filler pipe. A fuel tank fill assembly 10B comprising a filler-pipe anchor bracket 20B in accordance with a second embodiment of the present disclosure is shown in FIGS. 7-9. A fuel tank fill assembly 10C comprising a filler-pipe anchor bracket 20C in accordance with a third embodiment of the present disclosure is shown in FIGS. 10-12. A fuel tank fill assembly 10D in accordance with a fourth embodiment of the present disclosure is shown in FIGS. 13-15 and discloses that a filler-pipe anchor bracket 20D is coupled to a fuel filler pipe 18 and to a fuel vapor conduit that is arranged to extend alongside fuel filler pipe 18 from an outlet end 18O of fuel filler pipe 18 to a vapor space in a fuel tank 14.

In a two-step coating sequence used to coat the uncoated fuel-delivery conduit 11 and illustrated in FIGS. 5 and 6, a corrosion-resistant first coating material 31 flows onto filler-pipe anchor bracket 20 and fuel filler pipe 18 and into dual-coat flow gaps (G) to form a first coating layer 31L in dual-coat flow gaps (G). Next, a corrosion-resistant second coating material 32 flows onto the first coating layer 31L on filler-pipe anchor bracket 20 and fuel filler pipe 18 and into dual-coat flow gaps (G) to form a second coating layer 32L in dual-coat flow gaps (G). These coating layers 31L, 32L cooperate to form a multi-layer corrosion-resistant protective coating 30 all over fuel-delivery conduit 11 and inside the dual-coat flow gaps (G) associated with fuel-delivery conduit 11 in accordance with the present disclosure. In a similar manner, dual-coat flow gaps (G2), (G3), or (G4) are created in the other embodiments disclosed herein to facilitate formation of a two-layer corrosion-resistant protective coating on uncoated components included in the companion fuel tank fill assembly.

In illustrative embodiments of the present disclosure, fuel filler pipe 18 is made of carbon steel, first coating material 31 is an undercoat zinc-rich primer, and second coating material 32 is a top-coat anti-corrosion paint made, for example, of a durable thermoset material. It is within the scope of the present disclosure to apply second coating material 32 to a carbon steel pipe carrying an electroplated zinc-nickel primer using dip, drain, or spray applications. In accordance with the present disclosure, the multi-layer corrosion-resistant protective coating 30 is applied to an uncoated fuel-delivery conduit 11 to provide a fuel tank fill assembly 10 shown in FIGS. 1 and 6 that meets establish fifteen year laboratory and vehicle corrosion testing standards.

Fuel filler pipe 18 of fuel-delivery conduit 11 includes a nozzle-receiving outer end 18O associated with and linked to inlet cup 16 and a fuel-discharging inner end 18I adapted to be coupled to fuel tank 14 to discharge fuel into interior region 14I of fuel tank 14 as shown in FIG. 1. Fuel filler pipe 18 also includes an interior surface 18N arranged to define a fuel-conducting conduit 18C extending between and interconnecting nozzle-receiving outer end 18O and fuel-discharging inner end 18I and an exterior surface 18E arranged to face away from fuel-conducting conduit 18C as shown in FIGS. 2 and 3.

Coating maximizer filler-pipe anchor bracket 20 of the uncoated fuel-delivery conduit 11 includes a mount-support flange 21 and a friction-fit pipe mount 22 as shown in FIGS. 1-3. Filler-pipe anchor bracket 20 is made of carbon steel in illustrative embodiments. Mount-support flange 21 is adapted to be coupled to a vehicle frame 10F to support fuel filler pipe 18 relative to vehicle frame 10F to cause fuel-discharging inner end 18I to communicate with interior region 14I of fuel tank 14. Friction-fit pipe mount 22 is coupled to mount-support flange 21 and to exterior surface 18E of fuel filler pipe 18 to retain mount-support flange 21 in fixed relation to fuel filler pipe 18. Friction-fit pipe mount 22 includes several inner surfaces 22I that face toward exterior surface 18E of fuel filler pipe 18 as shown in FIG. 3.

Multi-layer protective coating 30 covers exposed portions of exterior surface 18E of fuel pipe 18, filler-pipe anchor bracket 20, and inlet cup 16 as suggested in FIGS. 1 and 6. In illustrative embodiments, multi-layer protective coating 30 also covers an inner surface 18N of fuel filler pipe 18 as shown in FIG. 6. Protective coating 30 comprises a first coating layer 31L made of primer 31 and adhered to exterior surface 18E of fuel filler pipe 18 and filler-pipe anchor bracket 20 and a second coating layer 32L made of paint 32 and adhered to exposed surfaces of first coating layer 31L as suggested in FIG. 6.

Each dual-coat flow gap (G) is sized in accordance with the present disclosure to allow a zinc-rich primer 31 and a top-coat anti-corrosion paint 32 to flow into dual-coat flow gap (G) when the primer 31 and paint 32 are applied in sequence as suggested in FIGS. 5 and 6 after the filler-pipe anchor bracket 20 has been coupled to the fuel filler pipe 18 using a friction-fit system in accordance with the present disclosure as suggested in FIG. 4. Inner surfaces 22I of friction-fit pipe mount 22 of coating maximizer filler-pipe anchor bracket 20 and opposed portions of the cylindrical exterior surface 18E of fuel filler pipe 18 are arranged to lie in confronting spaced-apart relation to one another as shown, for example, in FIGS. 2 and 3. Inner surfaces 22I and the opposed portions of cylindrical exterior surface 18E cooperate to form therebetween dual-coat flow gap (G) means for first allowing first coating layer 31L to adhere to exposed portions of inner surface 22I of pipe mount 22 and the undercoat primer 31 on the opposed portion of cylindrical exterior surface 18E of fuel filler pipe 18 during deposition of first coating layer 31L on pipe mount 22 and fuel filler pipe 18 and thereafter allowing second coating layer 32L of top-coat paint 32 to adhere to exposed portions of first coating layer 31L located in a dual-coat flow gap (G) provided between friction-fit pipe mount 22 and fuel filler pipe 18. An exposed surface of second coating layer 32L located in the dual-coat flow gap (G) cooperates to form an open space (S) located between friction-fit pipe mount 22 and the opposed portions of exterior surface 18E of fuel filler pipe 18 as suggested in FIG. 6.

Friction-fit pipe mount 22 of filler-pipe anchor bracket 20 includes three friction tabs T1, T2, and T3 and three coating bridges B1, B2, and B3 as suggested in FIG. 3. Friction tabs T1, T2, and T3 are arranged to lie in circumferentially spaced-apart relation from one another about and in engagement with a an exterior surface 18E of fuel filler pipe 18 as suggested in FIG. 3. Each friction tab T1, T2, T3 is formed to include a series of teeth that engage cylindrical exterior surface 18E as shown in FIG. 3. Coating bridge B1 interconnects friction tabs T1 and T3. Coating bridge B2 interconnects friction tabs T1 and T2. Coating bridge B3 interconnects friction tabs T2 and T3. Each of coating bridges B1, B2, and B3 is arranged to lie in radially outwardly spaced-apart relation to a confronting portion of the cylindrical exterior surface 18E of fuel filler pipe 18 that lies between the two friction tabs that are coupled to the selected coating bridge so as to define therebetween a dual-coat flow gap (G) as shown in FIGS. 3 and 4. Thus, three separate dual-coat flow gaps (G) are formed—one dual-coat flow gap (G) for each of the coating bridges B1, B2, and B3.

Each of coating bridges B2 and B3 is curved in cross-section as shown, for example, in FIGS. 3 and 4. Coating bridge B1 is shaped differently in that it includes an upper segment B1U and a separate lower segment B1L as shown, for example, in FIGS. 3 and 4. An inner portion of upper segment B1U is curved in cross section and coupled to friction tab T1 and an outer end of upper segment B1U is flat and coupled to mount-support flange 21. An inner portion of lower segment B1L is curved in cross section and coupled to friction tab T3, an outer portion of lower segment B1L is flat and coupled to mount-support flange 21, and a middle portion of the lower segment B1L is V-shaped in cross section and arranged to interconnect the inner and outer portions of lower segment B1L. Fastener 222 of pipe mount 22 is coupled to each of the flat upper and lower segments B1U, B1L of first coating bridge B1 to tighten friction-fit pipe mount 22 around the circular outer surface 18E of the fuel filler pipe 18 to establish a friction fit between the free ends of friction tabs T1, T2, and T3 and the cylindrical exterior surface 18E of fuel filler pipe 18 as suggested in FIGS. 3 and 4 mount-support flange 21 is coupled to flat upper and lower segments B1U, B1L as suggested in FIG. 3.

Friction tabs T1, T2, and T3 cooperate with coating bridges B1, B2, and B3 as suggested in FIG. 4 to form a band 40 that surrounds the curved exterior surface 18E of fuel filler pipe 18. Fastener 222 is coupled to band 40 to tighten band 40 around fuel filler pipe 18 to establish a friction fit between free ends of friction tabs T1, T2, and T3 and the curved exterior surface 18E of fuel filler pipe 18 and hold band 40 in a stationary position surrounding a portion of fuel filler pipe 18. Fastener 222 is a bolt that is coupled to opposite ends of band 40 as shown in FIG. 4.

Band 40 includes a top strap 40T, a bottom strap 40B, and a loop 40L as suggested in FIG. 4. Bottom strap 40B is arranged to lie in side-by-side mating relation to top strap 40T. Loop 40L is arranged to interconnect top and bottom straps 40T, 40B and is formed to include friction tabs T1, T2, and T3 and coating bridges B2 and B3 as suggested in FIG. 4. Loop 40L has a width (W) as shown in FIG. 2 and each of friction tabs T1, T2, and T3 has a length that is about equal to loop width (W) as suggested in FIG. 2. Mount-support flange 21 is coupled to free ends of top and bottom straps 40T, 40B to block movement of bottom strap 40B relative to top strap 40T and to tighten loop 40L to lie in a stationary position wrapped around and in engagement with curved exterior surface 18E of fuel filler pipe 18 as suggested in FIGS. 2-4. Fastener 222 is coupled to top and bottom straps 40T, 40B as suggested in FIG. 4.

Each dual-coat flow gap (G) is sized to allow zinc-rich primer 31 and top-coat anti-corrosion paint 32 to move into dual-coat flow gap (G). Flow gap (G) is formed in accordance with the present disclosure to allow zinc-rich primer 31 and top-coat anti-corrosion paint 32 to coat a portion of exterior surface 18E of fuel filler pipe 18 upon application of the zinc-rich primer 31 and the top-coat anti-corrosion paint 32 when filler-pipe anchor bracket 20 is coupled to fuel filler pipe 18. It is contemplated that dual-coat flow gap (G) may be sized to a suitable height designed to facilitate the flow of primer and/or paint between fuel filler pipe 18 and friction-fit pipe mount 22.

A fuel tank fill assembly 10B in accordance with a second embodiment of the present disclosure is configured to conduct fuel from a fuel-dispensing pump nozzle 12 to a fuel tank 14 as suggested in FIG. 7. Fuel fill tank assembly 10B includes an inlet cup 16 sized to receive nozzle 12, a fuel filler pipe 18 configured to conduct liquid fuel discharged by nozzle 12 into inlet cup 16 to an interior region 14I of fuel tank 14, and a filler-pipe anchor bracket 20B. Fuel tank fill assembly 10B also includes a two-layer corrosion-resistant protection coating 30 applied in accordance with the present disclosure as suggested in FIGS. 7 and 9.

Filler-pipe anchor bracket 20B is mounted on fuel filler pipe 18 using a friction-fit system in accordance with the present disclosure to produce an uncoated fuel-delivery conduit 11B as suggested in FIG. 8 and to establish several dual-coat flow gaps (G2) between fuel filler pipe 18 and filler-pipe anchor bracket 20B as suggested in FIGS. 8 and 9. A corrosion-resistant protective coating 30 is applied to the uncoated fuel-delivery conduit 11B as suggested in FIG. 9 so that exposed portions of pipe 18 and bracket 20B bordering dual-coat flow gaps (G2) are coated in accordance with the present disclosure along with all other exposed portions of the uncoated fuel-delivery conduit 11B.

In a two-step coating sequence used to coat the uncoated fuel-delivery conduit 11B and illustrated in FIG. 9, a corrosion-resistant first coating material 31 flows onto filler-pipe anchor bracket 20B and fuel filler pipe 18 and into dual-coat flow gaps (G2) to form a first coating layer 31L in dual-coat flow gaps (G2). Next, a corrosion-resistant second coating material 32 flows onto the first coating layer 31L on filler-pipe anchor bracket 20B and fuel filler pipe 18 and into dual-coat flow gaps (G2) to form a second coating layer 32L in dual-coat flow gaps (G2). These coating layers 31L, 32L cooperate to form a multi-layer corrosion-resistant protective coating 30 all over fuel-delivery conduit 11B and inside the dual-coat flow gap (G2) associated with fuel-delivery conduit 11B in accordance with the present disclosure.

In illustrative embodiments of the present disclosure, fuel filler pipe 18 is made of carbon steel, first coating material 31 is an undercoat zinc-rich primer, and second coating material 32 is a top-coat anti-corrosion paint made, for example, of a durable thermoset material. It is within the scope of the present disclosure to apply second coating material 32 to a carbon steel pipe carrying an electroplated zinc-nickel primer using dip, drain, or spray applications. In accordance with the present disclosure, the multi-layer corrosion-resistant protective coating 30 is applied to an uncoated fuel-delivery conduit 11B to provide a fuel tank fill assembly 10B shown in FIGS. 7 and 9 that meets establish fifteen year laboratory and vehicle corrosion testing standards.

Fuel filler pipe 18 of fuel-delivery conduit 11B includes a nozzle-receiving outer end 18O associated with and linked to inlet cup 16 and a fuel-discharging inner end 18I adapted to be coupled to fuel tank 14 to discharge fuel into interior region 14I of fuel tank 14 as shown in FIG. 7. Fuel filler pipe 18 also includes an interior surface 18N arranged to define a fuel-conducting conduit 18C extending between and interconnecting nozzle-receiving outer end 18O and fuel-discharging inner end 18I and an exterior surface 18E arranged to face away from fuel-conducting conduit 18C as shown in FIGS. 8 and 9.

Coating maximizer filler-pipe anchor bracket 20B of the uncoated fuel-delivery conduit 11 includes a mount-support flange 21B and a friction-fit pipe mount 22B as shown in FIGS. 8 and 9. Filler-pipe anchor bracket 20B is made of carbon steel in illustrative embodiments. Mount-support flange 21B is adapted to be coupled to a vehicle frame 10F to support fuel filler pipe 18 relative to vehicle frame 10F to cause fuel-discharging inner end 18I to communicate with interior region 14I of fuel tank 14. Friction-fit pipe mount 22B is coupled to mount-support flange 21B and to exterior surface 18E of fuel filler pipe 18 to retain mount-support flange 21B in fixed relation to fuel filler pipe 18. Friction-fit pipe mount 22B includes several inner surfaces 22BI that face toward exterior surface 18E of fuel filler pipe 18 as shown in FIG. 9.

Multi-layer protective coating 30 covers exposed portions of exterior surface 18E of fuel pipe 18, filler-pipe anchor bracket 20B, and inlet cup 16 as suggested in FIGS. 7 and 9. In illustrative embodiments, multi-layer protective coating 30 may also cover an inner surface 18N of fuel filler pipe 18. Protective coating 30 comprises a first coating layer 31L made of primer 31 and adhered to exterior surface 18E of fuel filler pipe 18 and filler-pipe anchor bracket 20B and a second coating layer 32L made of paint 32 and adhered to exposed surfaces of first coating layer 31L as suggested in FIG. 9.

Each dual-coat flow gap (G2) is sized in accordance with the present disclosure to allow a zinc-rich primer 31 and a top-coat anti-corrosion paint 32 to dual-coat flow into flow gap (G2) when the primer 31 and paint 32 are applied in sequence as suggested in FIG. 9 after the filler-pipe anchor bracket 20B has been coupled to the fuel filler pipe 18 using a friction-fit system in accordance with the present disclosure as suggested in FIG. 9. Inner surfaces 22BI of pipe mount 22B of coating maximizer filler-pipe anchor bracket 20B and opposed portions of cylindrical exterior surface 18E of fuel filler pipe 18 are arranged to lie in confronting spaced-apart relation to one another as shown, for example, in FIGS. 8 and 9. Inner surfaces 22BI and opposed portions of cylindrical exterior surface 18E cooperate to form therebetween dual-coat flow gap (G2) means for first allowing first coating layer 31L to adhere to exposed portions of inner surfaces 22BI of friction-fit pipe mount 22B and the undercoat primer 31 on the opposed portions of exterior surface 18E of fuel filler pipe 18 during deposition of first coating layer 31L on friction-fit pipe mount 22B and fuel filler pipe 18 and thereafter allowing second coating layer 32L of top-coat paint 32 to adhere to exposed portions of first coating layer 31L located in a dual-coat flow gap (G2) provided between friction-fit pipe mount 22B and fuel filler pipe 18. An exposed surface of second coating layer 32L located in the dual-coat flow gap (G2) cooperates to form an open space (S) located between pipe mount 22B and the opposed portions of exterior surface 18E of fuel filler pipe 18 as suggested in FIG. 9.

Friction-fit pipe mount 22 of filler-pipe anchor bracket 20 includes four pairs of side-by-side friction tabs T1, T2, T3, and T4 and four coating bridges B1, B2, B3, and B4 as suggested in FIGS. 8 and 9. The pairs of side-by-side friction tabs T1, T2, T3, and T4 are arranged to lie in circumferentially spaced-apart relation from one another about and in engagement with a an exterior surface 18E of fuel filler pipe 18 as suggested in FIGS. 3 and 4. Each friction tab T1, T2, T3, and T4 is formed to include a series of teeth that engage exterior surface 18E as shown in FIG. 3. Coating bridge B1 interconnects pairs of side-by-side friction tabs T1 and T2. Coating bridge B2 interconnects pairs of side-by-side friction tabs T2 and T3. Coating bridge B3 interconnects pairs of side-by-side friction tabs T3 and T4. Coating bridge B4 interconnects pairs of side-by-side friction tabs T4 and T1. In illustrative embodiments, each friction tab T1-T4 is formed by using a moving tool to apply a force to one side of the friction-fit pipe mount in a press to form a protrusion shaped to provide one of friction tabs T1-T4.

Each of coating bridges B1, B2, B3, and B4 is arranged to lie in radially outwardly spaced-apart relation to a confronting portion of the cylindrical exterior surface 18E of fuel filler pipe 18 that lies between the pairs of side-by-side friction tabs that are coupled to the selected coating bridge so as to define therebetween a dual-coat flow gap (G2) as shown in FIGS. 3 and 4. Thus, four separate dual-coat flow gaps (G2) are formed—one dual-coat flow gap (G2) for each of the coating bridges B1, B2, B3, and B4.

Each of coating bridges B1, B2 and B3 is curved in cross-section as shown, for example, in FIG. 9. Coating bridge B4 is shaped differently in that it includes an upper segment B4U and a lower segment B4L as shown, for example, in FIGS. 8 and 9. An inner portion of upper segment B4U is curved in cross section and coupled to friction tab T1 and an outer end of upper segment B4U is flat and coupled to mount-support flange 21. An inner portion of lower segment B4L is curved in cross section and coupled to friction tab T4 and an outer portion of lower segment B4L is flat and coupled to mount-support flange 21. Fastener 222 of friction-fit pipe mount 22B is coupled to each of the flat upper and lower segments B4U, B4L of fourth coating bridge B4 to tighten friction-fit pipe mount 22 around the circular outer surface 18E of the fuel filler pipe 18 to establish a friction fit between the free ends of pairs of side-by-side friction tabs T1, T2, T3, and T4 and the cylindrical exterior surface 18E of fuel filler pipe 18 as suggested in FIGS. 8 and 9. Mount-support flange 21B is coupled to flat upper and lower segments B4U, B4L as suggested in FIG. 9.

Friction tabs T1, T2, T3, and T4 cooperate with coating bridges B1, B2, B3, and B4 as suggested in FIG. 2 to form a band 40B that surrounds the exterior surface 18E of fuel filler pipe 18 as shown in FIGS. 8 and 9. Fastener 222B is coupled to band 40B as suggested diagrammatically in FIG. 8 to tighten band 40B around fuel filler pipe 18 to establish a friction fit between free ends of friction tabs T1, T2, T3, and T4 and the cylindrical exterior surface 18E of fuel filler pipe 18 and hold band 40B in a stationary position surrounding a portion of fuel filler pipe 18. Fastener 222B may be a bolt or weldment that is coupled to opposite ends of band 40B.

Band 40B includes a top strap 40BT, a bottom strap 40BB, and a loop 40BL as suggested in FIG. 8. Bottom strap 40BB is arranged to lie in side-by-side mating relation to top strap 40BT. Loop 40BL is arranged to interconnect top and bottom straps 40BT, 40BB and is formed to include friction tabs T1, T2, T3, and T4 and coating bridges B1, B2, and B3. Mount-support flange 21 is coupled to free ends of top and bottom straps 40BT, 40BB to block movement of bottom strap 40BB relative to top strap 40BT and to tighten loop 40BL to lie in a stationary position wrapped around and in engagement with cylindrical exterior surface 18E of fuel filler pipe 18.

A fuel tank fill assembly 10C in accordance with a third embodiment of the present disclosure is configured to conduct fuel from a fuel-dispensing pump nozzle 12 to a fuel tank 14 as suggested in FIG. 10. Fuel fill tank assembly 10C includes an inlet cup 16 sized to receive nozzle 12, a fuel filler pipe 18 configured to conduct liquid fuel discharged by nozzle 12 into inlet cup 16 to an interior region 14I of fuel tank 14, and a filler-pipe anchor bracket 20C. Fuel tank fill assembly 10C also includes a two-layer corrosion-resistant protection coating 30 applied in accordance with the present disclosure as suggested in FIGS. 10 and 12.

Filler-pipe anchor bracket 20C is mounted on fuel filler pipe 18 using a friction-fit system in accordance with the present disclosure to produce an uncoated fuel-delivery conduit 11C as suggested in FIG. 11 and to establish several dual-coat flow gaps (G3) between fuel filler pipe 18 and filler-pipe anchor bracket 20C as suggested in FIGS. 11 and 12. A corrosion-resistant protective coating 30 is applied to the uncoated fuel-delivery conduit 11C as suggest in FIG. 12 so that exposed portions of pipe 18 and bracket 20C bordering dual-coat flow gaps (G3) are coated in accordance with the present disclosure along with all other exposed portions of the uncoated fuel-delivery conduit 11C.

In a two-step coating sequence used to coat the uncoated fuel-delivery conduit 11C and illustrated in FIG. 12, a corrosion-resistant first coating material 31 flows onto filler-pipe anchor bracket 20C and fuel filler pipe 18 and into dual-coat flow gaps (G3) to form a first coating layer 31L in dual-coat flow gaps (G3). Next, a corrosion-resistant second coating material 32 flows onto the first coating layer 31L on filler-pipe anchor bracket 20C and fuel filler pipe 18 and into dual-coat flow gaps (G3) to form a second coating layer 32L in dual-coat flow gaps (G3). These coating layers 31L, 32L cooperate to form a multi-layer corrosion-resistant protective coating 30 all over fuel-delivery conduit 11C and inside the dual-coat flow gap (G3) associated with fuel-delivery conduit 11C in accordance with the present disclosure.

In illustrative embodiments of the present disclosure, fuel filler pipe 18 is made of carbon steel, first coating material 31 is an undercoat zinc-rich primer, and second coating material 32 is a top-coat anti-corrosion paint made, for example, of a durable thermoset material. It is within the scope of the present disclosure to apply second coating material 32 to a carbon steel pipe carrying an electroplated zinc-nickel primer using dip, drain, or spray applications. In accordance with the present disclosure, the multi-layer corrosion-resistant protective coating 30 is applied to an uncoated fuel-delivery conduit 11C to provide a fuel tank fill assembly 10C shown in FIGS. 10 and 12 that meets establish fifteen year laboratory and vehicle corrosion testing standards.

Fuel filler pipe 18 of fuel-delivery conduit 11C includes a nozzle-receiving outer end 18O associated with and linked to inlet cup 16 and a fuel-discharging inner end 18I adapted to be coupled to fuel tank 14 to discharge fuel into interior region 14I of fuel tank 14 as shown in FIG. 10. Fuel filler pipe 18 also includes an interior surface 18N arranged to define a fuel-conducting conduit 18C extending between and interconnecting nozzle-receiving outer end 18O and fuel-discharging inner end 18I and an exterior surface 18E arranged to face away from fuel-conducting conduit 18C as shown in FIGS. 11 and 12.

Coating maximizer filler-pipe anchor bracket 20C of the uncoated fuel-delivery conduit 11 includes a mount-support flange 21C and a friction-fit pipe mount 22C as shown in FIGS. 11 and 12. Filler-pipe anchor bracket 20C is made of carbon steel in illustrative embodiments. Mount-support flange 21C is adapted to be coupled to a vehicle frame 10F to support fuel filler pipe 18 relative to vehicle frame 10F to cause fuel-discharging inner end 18I to communicate with interior region 14I of fuel tank 14. Friction-fit pipe mount 22C is coupled to mount-support flange 21C and to exterior surface 18E of fuel filler pipe 18 to retain mount-support flange 21C in fixed relation to fuel filler pipe 18. Friction-fit pipe mount 22C includes several inner surfaces 22CI that face toward exterior surface 18E of fuel filler pipe 18 as shown in FIG. 12.

Multi-layer protective coating 30 covers exposed portions of exterior surface 18E of fuel pipe 18, filler-pipe anchor bracket 20C, and inlet 16 as suggested in FIGS. 10 and 12. In illustrative embodiments, multi-layer protective coating 30 may also cover an inner surface 18N of fuel filler pipe 18. Protective coating 30 comprises a first coating layer 31L made of primer 31 and adhered to exterior surface 18E of fuel filler pipe 18, fuel vapor conduit 118, and filler-pipe anchor bracket 20C and a second coating layer 32L made of paint 32 and adhered to exposed surfaces of first coating layer 31L as suggested in FIG. 12.

Each dual-coat flow gap (G3) is sized in accordance with the present disclosure to allow a zinc-rich primer 31 and a top-coat anti-corrosion paint 32 to flow into dual-coat flow gap (G3) when the primer 31 and paint 32 are applied in sequence as suggested in FIG. 12 after the filler-pipe anchor bracket 20C has been coupled to the fuel filler pipe 18 using a friction-fit system in accordance with the present disclosure as suggested in FIG. 12. Inner surfaces 22CI of friction-fit pipe mount 22C of coating maximizer filler-pipe anchor bracket 20C and opposed portions of cylindrical exterior surface 18E of fuel filler pipe 18 are arranged to lie in confronting spaced-apart relation to one another as shown, for example, in FIGS. 11 and 12. Inner surfaces 22CI and the opposed portions of cylindrical exterior surface 18E cooperate to form therebetween dual-coat flow gap (G3) means for first allowing first coating layer 31L to adhere to exposed portions of inner surface 22CI of friction-fit pipe mount 22C and the undercoat primer 31 on the opposed portion of cylindrical exterior surface 18E of fuel filler pipe 18 during deposition of first coating layer 31L on pipe mount 22C and fuel filler pipe 18 and thereafter allowing second coating layer 32L of top-coat paint 32 to adhere to exposed portions of first coating layer 31L located in a dual-coat flow gap (G3) provided between pipe mount 22C and fuel filler pipe 18. An exposed surface of second coating layer 32L located in the dual-coat flow gap (G3) cooperates to form an open space (S) in each region (G3), (G32) of dual-coat flow gap (G3) that is located between pipe mount 22C and the opposed portions of cylindrical exterior surface 18E of fuel filler pipe 18 as suggested in FIG. 12.

Friction-fit pipe mount 22 of filler-pipe anchor bracket 20 includes four friction tabs T1, T2, T3, and T4 and four coating bridges B1, B2, B3, and B4 as suggested in FIG. 12. Friction tabs T1, T2, T3, and T4 are arranged to lie in circumferentially spaced-apart relation from one another about and in engagement with an exterior surface 18E of fuel filler pipe 18 as suggested in FIGS. 11 and 12. Each friction tab T1, T2, T3, and T4 is formed to include a series of teeth that engage exterior surface 18E as shown in FIG. 12. Coating bridge B1 interconnects friction tabs T1 and T2. Coating bridge B2 interconnects friction tabs T2 and T3. Coating bridge B3 interconnects friction tabs T3 and T4. Coating bridge B4 interconnects friction tabs T4 and T1. Each of coating bridges B1, B2, B3, and B4 is arranged to lie in radially outwardly spaced-apart relation to a confronting portion of the cylindrical exterior surface 18E of fuel filler pipe 18 that lies between the two friction tabs that are coupled to the selected coating bridge so as to define therebetween a dual-coat flow gap (G3) as shown in FIGS. 3 and 4. Thus, four separate dual-coat flow gaps (G3) are formed—one dual-coat flow gap (G3) for each of the coating bridges B1, B2, B3, and B4.

Each of coating bridges B1, B2 and B3 is curved in cross-section as shown, for example, in FIG. 12. Coating bridge B4 is shaped differently in that it includes an upper segment B4U and a lower segment B4L as shown, for example, in FIGS. 11 and 12. An inner portion of upper segment B4U is curved in cross section and coupled to friction tab T1 and an outer end of upper segment B4U is flat and coupled to mount-support flange 21. An inner portion of lower segment B4L is curved in cross section and coupled to friction tab T4 and an outer portion of lower segment B4L is flat and coupled to mount-support flange 21. Fastener 222 of friction-fit pipe mount 22C is coupled to each of the flat upper and lower segments B4U, B4L of fourth coating bridge B4 to tighten friction-fit pipe mount 22C around the circular outer surface 18E of the fuel filler pipe 18 to establish a friction fit between the free ends of friction tabs T1, T2, T3, and T4 and the cylindrical exterior surface 18E of fuel filler pipe 18 as suggested in FIGS. 11 and 12. Mount-flange support 21C is coupled to flat upper and lower segments B4U, B4L as suggested in FIG. 12.

Friction tabs T1, T2, T3, and T4 cooperate with coating bridges B1, B2, B3, and B4 as suggested in FIG. 4 to form a band 40C that surrounds the exterior surface 18E of fuel filler pipe 18. Fastener 222C is coupled to band 40C to tighten band 40C around fuel filler pipe 18 to establish a friction fit between free ends of friction tabs T1, T2, T3, and T4 and the exterior surface 18E of fuel filler pipe 18 and hold band 40C in a stationary position surrounding a portion of fuel filler pipe 18. Fastener 222C may be a bolt or weldment that is coupled to opposite ends of band 40C.

Band 40C includes a top strap 40CT, a bottom strap 40CB, and a loop 40CL as suggested in FIG. 11. Bottom strap 40CB is arranged to lie in side-by-side mating relation to top strap 40CT. Loop 40CL is arranged to interconnect top and bottom straps 40CT, 40CB and is formed to include friction tabs T1, T2, T3, and T4 and coating bridges B1, B2, and B3. Mount-support flange 21 is coupled to free ends of top and bottom straps 40CT, 40CB to block movement of bottom strap 40CB relative to top strap 40CT and to tighten loop 40CL to lie in a stationary position wrapped around and in engagement with exterior surface 18E of fuel filler pipe 18.

Loop 40CL of band 40C has a width (W) as shown in FIG. 11. Each of friction tabs T1, T2, T3, and T4 has a length that is about equal to loop width (W) as suggested in FIG. 11.

Band 40C is made of a single strip of metal material as suggested in FIG. 11. Band 40C is formed (e.g., folded) to produce, in series, from end to end, upper segment B4U of coating bridge B4, first friction tab T1, first coating bridge B1, second friction tab T2, second coating bridge B2, third friction tab T3, third coating bridge B3, fourth friction tab T4, and lower segment B4L of coating bridge B4 as suggested in FIG. 12.

A fuel tank fill assembly 10D in accordance with a fourth embodiment of the present disclosure is configured to conduct fuel from a fuel-dispensing pump nozzle 12 to a fuel tank 14 as suggested in FIG. 13. Fuel fill tank assembly 10D includes an inlet cup 16 sized to receive nozzle 12, a fuel filler pipe 18 configured to conduct liquid fuel discharged by nozzle 12 into inlet cup 16 to an interior region 14I of fuel tank 14, and a filler-pipe anchor bracket 20D. Fuel vapor conduit 118 is configured to conduct fuel vapor from a vapor space provided in fuel tank 14 under the control of a differential pressure valve 118V to an outlet end 18O of fuel filler pipe to be re-entrained into liquid fuel being dispensed by nozzle 12 under certain conditions during vehicle refueling. Fuel tank fill assembly 10D also includes a two-layer corrosion-resistant protection coating 30 applied in accordance with the present disclosure as suggested in FIGS. 13 and 15.

Filler-pipe anchor bracket 20D is mounted on fuel filler pipe 18 using a friction-fit system in accordance with the present disclosure to produce an uncoated fuel-delivery conduit 11D as suggested in FIG. 14 and to establish several dual-coat flow gaps (G4) between fuel filler pipe 18 and filler-pipe anchor bracket 20D as suggested in FIGS. 14 and 15. Filler-pipe anchor bracket 20D is also coupled to the uncoated fuel vapor conduit 118 that is arranged to extend alongside fuel filler pipe 18 as suggested in FIGS. 13 and 14 to provide several dual-coat flow gaps (G4) between fuel vapor conduit 118 and filler-pipe anchor bracket 20D as suggested in FIGS. 14 and 15. A corrosion-resistant protective coating 30 is applied to the uncoated fuel-delivery conduit 11D and uncoated fuel vapor conduit 118 as suggested in FIG. 15 so that exposed portions of pipe 18 and conduit 118 and bracket 20D bordering dual-coat flow gaps (G4) are coated in accordance with the present disclosure along with all other exposed portions of the uncoated fuel-delivery conduit 11D and fuel vapor conduit 118.

In a two-step coating sequence used to coat the uncoated fuel-delivery conduit 11D and fuel vapor conduit 118 and illustrated in FIG. 15, a corrosion-resistant first coating material 31 flows onto filler-pipe anchor bracket 20D and fuel filler pipe 18 and fuel vapor conduit 118 and into dual-coat flow gaps (G4) to form a first coating layer 31L in dual-coat flow gaps (G4). Next, a corrosion-resistant second coating material 32 flows onto the first coating layer 31L on filler-pipe anchor bracket 20D and fuel filler pipe 18 and fuel vapor conduit 118 and into dual-coat flow gaps (G4) to form a second coating layer 32L in dual-coat flow gaps (G4). These coating layers 31L, 32L cooperate to form a multi-layer corrosion-resistant protective coating 30 all over fuel-delivery conduit 11D and fuel vapor conduit 118 and inside the dual-coat flow gaps (G4) associated with fuel-delivery conduit 11D and fuel vapor conduit 118 in accordance with the present disclosure.

In illustrative embodiments of the present disclosure, each of fuel filler pipe 18 and fuel vapor conduit 118 is made of carbon steel, first coating material 31 is an undercoat zinc-rich primer, and second coating material 32 is a top-coat anti-corrosion paint made, for example, of a durable thermoset material. It is within the scope of the present disclosure to apply second coating material 32 to a carbon steel pipe carrying an electroplated zinc-nickel primer using dip, drain, or spray applications. In accordance with the present disclosure, the multi-layer corrosion-resistant protective coating 30 is applied to an uncoated fuel-delivery conduit 11D and an uncoated fuel vapor conduit 118 to provide a fuel tank fill assembly 10D shown in FIGS. 13 and 15 that meets establish fifteen year laboratory and vehicle corrosion testing standards.

Fuel filler pipe 18 of fuel-delivery conduit 11D includes a nozzle-receiving outer end 18O associated with and linked to inlet cup 16 and a fuel-discharging inner end 18I adapted to be coupled to fuel tank 14 to discharge fuel into interior region 14I of fuel tank 14 as shown in FIG. 13. Fuel filler pipe 18 also includes an interior surface 18N arranged to define a fuel-conducting conduit 18D extending between and interconnecting nozzle-receiving outer end 18O and fuel-discharging inner end 18I and an exterior surface 18E arranged to face away from fuel-conducting conduit 18D as shown in FIGS. 14 and 15.

Coating maximizer filler-pipe anchor bracket 20D of the uncoated fuel-delivery conduit 11 includes a mount-support flange 21D and a friction-fit pipe mount 22D as shown in FIGS. 14 and 15. Filler-pipe anchor bracket 20D is made of carbon steel in illustrative embodiments. Mount-support flange 21D is adapted to be coupled to a vehicle frame 10F to support fuel filler pipe 18 and fuel vapor conduit 118 relative to vehicle frame 10F to cause fuel-discharging inner end 18I of fuel filler pipe 18 to communicate with interior region 14I of fuel tank 14. An inner end of fuel vapor conduit 118 is also supported to communicate with a valve 118V that communicates with interior region 14I of fuel tank 14 as suggested in FIG. 13. Friction-fit pipe mount 22D is coupled to mount-support flange 21D and to exterior surface 18E of fuel filler pipe 18 to retain mount-support flange 21D in fixed relation to fuel filler pipe 18. Friction-fit pipe mount 22D includes an inner surface 22DI facing toward exterior surface 18E of fuel filler pipe 18 as shown in FIG. 15.

Multi-layer protective coating 30 covers exposed portions of exterior surface 18E of fuel pipe 18, fuel vapor conduit 118, filler-pipe anchor bracket 20D, and inlet 16 as suggested in FIGS. 13 and 15. In illustrative embodiments, multi-layer protective coating 30 may also cover an inner surface of fuel filler pipe 18 and fuel vapor conduit 118. Protective coating 30 comprises a first coating layer 31L made of primer 31 and adhered to exterior surface 18E of fuel filler pipe 18 and filler-pipe anchor bracket 20D and a second coating layer 32L made of paint 32 and adhered to exposed surfaces of first coating layer 31L as suggested in FIG. 15.

Each dual-coat flow gap (G4) is sized in accordance with the present disclosure to allow a zinc-rich primer 31 and a top-coat anti-corrosion paint 32 to flow into dual-coat flow gap (G4) when the primer 31 and paint 32 are applied in sequence as suggested in FIG. 15 after the filler-pipe anchor bracket 20D has been coupled to the fuel filler pipe 18 and fuel vapor conduit 118 using a friction-fit system in accordance with the present disclosure as suggested in FIG. 9. Inner surfaces 22DI of friction-fit pipe mount 22D of coating maximizer filler-pipe anchor bracket 20D and opposed portions of cylindrical exterior surface 18E of fuel filler pipe 18 are arranged to lie in confronting spaced-apart relation to one another as shown, for example, in FIGS. 14 and 15. Inner surfaces 22DI and opposed portions of cylindrical exterior surface 18E cooperate to form therebetween dual-coat flow gap (G4) means for first allowing first coating layer 31L to adhere to exposed portions of inner surface 22DI of friction-fit pipe mount 22D and the undercoat primer 31 on the opposed portion of cylindrical exterior surface 18E of fuel filler pipe 18 during deposition of first coating layer 31L on friction-fit pipe mount 22D and fuel filler pipe 18 and thereafter allowing second coating layer 32L of top-coat paint 32 to adhere to exposed portions of first coating layer 31L located in dual-coat flow gaps (G4) provided between friction-fit pipe mount 22D and fuel filler pipe 18. An exposed surface of second coating layer 32L located in the dual-coat flow gaps (G4) cooperates to form an open space (S) in each region of dual-coat flow gap (G4) that is located between friction-fit pipe mount 22D and the opposed portions of cylindrical exterior surface 18E of fuel filler pipe 18 as suggested in FIG. 15. The dual-coat flow gaps (G4) are also formed around fuel vapor conduit 118 as suggested in FIGS. 14 and 15.

Friction-fit pipe mount 22 of filler-pipe anchor bracket 20 includes seven friction tabs T1-T7 and six coating bridges B1-B6 as suggested in FIG. 15. Friction tabs T1-T4 and coating bridges B1-B4 are associated with fuel filler pipe 18. Friction tabs T5-T7 and coating bridges B2, B5, and B6 are associated with fuel vapor conduit 118.

Friction tabs T1-T7 are arranged to lie in circumferentially spaced-apart relation from one another about and in engagement with an exterior surface 18E of fuel filler pipe 18 as suggested in FIG. 15. Each friction tab T1, T2, T3, and T4 is formed to include a series of teeth that engage cylindrical exterior surface 18E of fuel filler pipe 18 as shown in FIG. 15. Coating bridge B1 interconnects friction tabs T1 and T2. Coating bridge B3 interconnects friction tabs T3 and T4. Each of coating bridges B1, B3, and B4 is arranged to lie in radially outwardly spaced-apart relation to a confronting portion of the cylindrical exterior surface 18E of fuel filler pipe 18 that lies between the two friction tabs that are coupled to the selected coating bridge so as to define therebetween a dual-coat flow gap (G4) as shown in FIGS. 3 and 4. Thus, three separate dual-coat flow gaps (G4) are formed—one dual-coat flow gap (G4) for each of the coating bridges B1, B3, and B4.

Each of coating bridges B1 and B3 is curved in cross-section as shown, for example, in FIG. 15. Coating bridge B4 is shaped differently in that it includes an upper segment B4U and a lower segment B4L as shown, for example, in FIGS. 14 and 15. An inner portion of upper segment B4U is curved in cross section and coupled to friction tab T1 and an outer end of upper segment B4U is flat and coupled to mount-support flange 21. An inner portion of lower segment B4L is curved in cross section and coupled to friction tab T4 and an outer portion of lower segment B4L is flat and coupled to mount-support flange 21. Fastener 222D of pipe mount 22 is coupled to each of the flat upper and lower segments B4U, B4L of fourth coating bridge B4 to tighten friction-fit pipe mount 22D around the circular outer surface 18E of the fuel filler pipe 18 to establish a friction fit between the free ends of friction tabs T1, T3, and T4 and the cylindrical exterior surface 18E of fuel filler pipe 18 as suggested in FIGS. 14 and 15.

Friction tabs T5-T7 are arranged to lie in circumferentially spaced-apart relation from one another about and in engagement with a cylindrical exterior surface of fuel vapor conduit 118 as suggested in FIG. 15. Each friction tab T5, T6, and T7 is formed to include a series of teeth that engage the cylindrical exterior surface of fuel vapor conduit 118 as shown in FIG. 15. Coating bridge B5 interconnects friction tabs T5 and T6. Coating bridge B6 interconnects friction tabs T6 and T7. A dual-coat flow gap (G4) is formed between fuel vapor conduit 118 and each of coating bridges B5 and B6 as shown in FIG. 15.

Coating bridge B2 is shaped differently in that it includes an upper segment B2U, a middle segment B2M, and a lower segment B2L in accordance with one way to define coating bridge B2 as shown in FIG. 15. Upper segment B2U interconnections friction tabs T2 and T5. Middle segment B2M is provide by a portion of fuel vapor conduit 118 as shown in FIG. 15. Lower segment B2L interconnects friction tabs T7 and T3. As suggested in FIG. 15, a relatively larger space (S4) is bounded by an exposed surface of coating layer 32L located in the dual-coat flow gap (G4) associated with second coating bridge B2 and formed between fuel vapor conduit 118 and fuel filler pipe 18 as suggested in FIG. 15

Friction tabs T1-T7 cooperate with coating bridges B1-B6 as suggested in FIG. 15 to form a band 40D that surrounds portions of the cylindrical exterior surface 18E of fuel filler pipe 18 and portions of the cylindrical exterior surface of fuel vapor conduit 118 as suggested in FIG. 15. Fastener 222D is coupled to band 40D to tighten band 40D around fuel filler pipe 18 to establish a friction fit between free ends of friction tabs T1, T2, T3, and T4 and the cylindrical exterior surface 18E of fuel filler pipe 18 and hold band 40D in a stationary position surrounding a portion of fuel filler pipe 18. Band 40D is also tightened using suitable means around fuel vapor conduit 118 to establish a friction fit between free ends of friction tabs T5, T6, and T7 and the cylindrical exterior surface of fuel vapor conduit 118 and hold band 40D in a stationary position surrounding a portion of fuel vapor conduit 118. Fastener 222 may be a bolt or weldment that is coupled to opposite ends of band 40D.

Band 40D includes a top strap 40DT, a bottom strap 40DB, and a loop 40DL as suggested in FIG. 15. Bottom strap 40DB is arranged to lie in side-by-side mating relation to top strap 40DT. Loop 40DL is arranged to interconnect top and bottom straps 40DT, 40DB and is formed to include friction tabs T1-T7 and coating bridges B1-B5. Mount-support flange 21 is coupled to free ends of top and bottom straps 40DT, 40DB to block movement of bottom strap 40DB relative to top strap 40DT and to tighten loop 40DL to lie in a stationary position wrapped around and in engagement with exterior surface 18E of fuel filler pipe 18 and exterior surface of fuel vapor conduit 118.

The invention claimed is:

1. A process for providing a fuel tank fill assembly, the process comprising the steps of
mounting a filler-pipe anchor bracket on a fuel filler pipe using a friction fit to produce an uncoated fuel-delivery conduit and to establish several dual-coat flow gaps between the fuel filler pipe and the filler-pipe anchor bracket, the mounting step comprising the steps of engaging a friction-fit pipe mount included in the filler-pipe anchor bracket to a curved exterior surface of the fuel filler pipe to form several dual-coat flow gaps between the curved exterior surface of the fuel filler pipe and an opposed inner surface of the friction-fit pipe mount, the engaging step comprising the steps of wrapping a band included in the friction-fit pipe mount and formed to include several friction tabs around the curved exterior surface of the fuel filler pipe and coupling a fastener included in the friction-fit pipe mount to the band to tighten the friction-fit pipe mount around the curved exterior surface of the fuel filler pipe to establish a friction fit between free ends of the friction tabs and the curved exterior surface of the fuel filler pipe to hold the band in a stationary position surrounding a portion of the fuel filler pipe so as to form the several dual-coat flow gaps between the curved exterior surface of the fuel filler pipe and inner surfaces of the band and friction tabs that provide the opposed inner surface of the friction fit pipe mount and applying a multi-layer protective coating to exposed portions of the friction-fit pipe mount and the fuel filler pipe included in the uncoated fuel-delivery conduit after the mounting step, the applying step including the steps of first introducing a first coating material into the dual-coat flow gaps to establish a first coating layer located in the several dual-coat flow gaps and adhered to the curved exterior surface of the fuel filler pipe and the opposed inner surface of the friction-fit pipe mount and then second introducing a second coating material into the several dual-coat flow gaps to establish a second coating layer on exposed portions of the first coating layer located in the several dual-coat flow gaps so that multi-layer protective coating is present in the several dual-coat flow gaps on portions of the curved exterior surface of the fuel filler pipe and the opposed inner surface of the friction-fit pipe mount that cooperate to define a boundary of the several dual-coat flow gaps.

2. The process of claim 1, wherein the several friction tabs that are included in the band are arranged to lie in circumferentially spaced-apart relation about and in engagement with the curved exterior surface of the fuel filler pipe, the band also includes several coating bridges, and each of the coating bridges is arranged to interconnect proximal ends of two adjacent friction tabs and lie in radially outwardly spaced-apart relation to a portion of the curved outer surface that extends between a pair of adjacent friction tabs.

3. The process of claim 2, wherein one of the coating bridges of the band comprises an upper segment coupled to a proximal end of one of the friction tabs and a separate lower segment coupled to a proximal end of another of the friction tabs and the fastener is coupled to each of the upper and lower segments.

4. The process of claim 3, wherein the upper segment includes an inner section that is curved and connected to the proximal end of one of the friction tabs and an outer section that is flat and is coupled to the fastener and wherein the lower segment includes an inner section that is curved and connected to the proximal end of one of the another of the friction tabs and an outer section that is flat and is coupled to the fastener.

5. The process of claim 2, wherein the band of the friction-fit pipe mount includes a top strap, a bottom strap arranged to lie in side-by-side mating relation to the top strap, and a loop that interconnects the top and bottom straps and is formed to include the friction tabs and portions of the coating bridges, and the fastener is coupled to the top and bottom straps to block movement of the bottom strap relative to the top strap and to tighten the loop to lie in a stationary position wrapped around and in engagement with the curved exterior surface of the fuel filler pipe.

6. The process of claim 5, wherein the top strap comprises an inner section that is curved and connected to the proximal end of one of the friction tabs and an outer section that is flat and coupled to the fastener.

7. The process of claim 6, wherein the bottom strap comprises an inner section that is curved and connected to the proximal end of one of the another of the friction tabs and an outer section that is flat and is coupled to the fastener.

8. The process of claim 7, wherein the filler-pipe anchor bracket further includes a mount-support flange coupled to the outer sections of the top and bottom straps.

9. The process of claim 5, wherein the bottom strap comprises an inner section that is curved and connected to the proximal end of one of the friction tabs and an outer section that is flat and coupled to the fastener.

10. The process of claim 5, wherein the filler-pipe anchor bracket further includes a mount-support flange coupled to free ends of the top and bottom straps to locate the fastener between the loop and the mount-support flange and adapted to mate with a vehicle frame to support the fuel filler pipe relative to the vehicle frame to communicate with a vehicle fuel tank associated with the vehicle frame.

* * * * *